United States Patent
Orr et al.

(10) Patent No.: US 6,771,518 B2
(45) Date of Patent: Aug. 3, 2004

(54) DC CONVERTERS

(75) Inventors: Raymond K Orr, Kanata (CA); Yan-Fei Liu, Kanata (CA)

(73) Assignee: Potentia Semiconductor, Inc., Wilmington, DE (US)

( * ) Notice: Subject to any disclaimer, the term of this patent is extended or adjusted under 35 U.S.C. 154(b) by 10 days.

(21) Appl. No.: 10/227,507

(22) Filed: Aug. 26, 2002

(65) Prior Publication Data

US 2004/0037100 A1 Feb. 26, 2004

(51) Int. Cl.[7] .......................... H02M 3/335; H02J 1/12
(52) U.S. Cl. ...................... 363/16; 363/39; 363/131; 323/290; 323/266
(58) Field of Search ........................ 363/16, 17, 39, 363/97, 89, 127, 131, 132; 323/282, 288, 290, 266, 271, 265, 299, 224, 286

(56) References Cited

U.S. PATENT DOCUMENTS

| | | | | |
|---|---|---|---|---|
| 4,184,197 A | | 1/1980 | Cuk et al. | 363/16 |
| 4,415,959 A | | 11/1983 | Vinciarelli | 363/21 |
| 4,814,962 A | * | 3/1989 | Magalhaes et al. | 363/16 |
| 4,868,730 A | | 9/1989 | Ward | 363/21 |
| 5,159,541 A | | 10/1992 | Jain | 363/26 |
| 5,570,276 A | * | 10/1996 | Cuk et al. | 363/16 |
| 5,642,267 A | * | 6/1997 | Brkovic et al. | 363/16 |
| 6,519,168 B2 | * | 2/2003 | Jain et al. | 363/98 |

* cited by examiner

Primary Examiner—Rajnikant B Patel

(57) ABSTRACT

In a DC converter, a transformer has a first winding coupled in series with a first capacitor and a first switch between a first pair of terminals, and a second winding coupled in series with a second capacitor and an inductor between a second pair of terminals. A second switch is coupled in parallel with the series-connected first winding and first capacitor. A third switch or diode is coupled in parallel with the series-connected second winding and second capacitor. The capacitors provide energy transfer in either direction via the transformer. Leakage inductance of the transformer facilitates zero voltage switching conditions, and the transformer core is reset in each cycle by charge balancing between the capacitors. The switches can comprise AC switches. The transformer can be an autotransformer.

28 Claims, 9 Drawing Sheets

DC CONVERTERS

This invention relates to DC converters, and is particularly concerned with DC converters in which a transformer provides coupling between an input circuit and an output circuit of the converter. DC converters are alternatively referred to as DC-to-DC converters, DC or DC-to-DC regulators, switch mode regulators, converters, or power supplies, etc.; the term "DC converter" or simply "converter" is used herein to include all such terms.

These terms as used herein also embrace converters for which a supply coupled to the input circuit can comprise a relatively low frequency alternating or varying voltage optionally with a DC component, and/or for which the output can comprise a relatively low frequency alternating or varying voltage optionally with a DC component (e.g. a telephone ringing signal), in other words a DC converter that can operate in all quadrants.

BACKGROUND

There is a wide variety of known DC converter topologies which are derived from at least one transformer in combination with components of at least one forward converter (also referred to as a buck regulator) and/or at least one flyback converter (also referred to as a boost regulator).

For example, a so-called single-ended forward converter is known which comprises a buck regulator together with a transformer and a rectifier diode, the transformer having a single primary winding which is connected via a switch of the buck regulator to a DC input. As is well known, in a single-ended forward converter it is necessary to take steps, involving additional components or circuitry, to ensure that the transformer core is reset in each switching cycle, i.e. to ensure that the net magnetization of the transformer core in each cycle is zero, to avoid magnetic saturation of the core.

It is also known to replace diodes in DC converters by switches, e.g. MOSFETs, which are operated synchronously in the converter switching cycles. The synchronous switches can provide lower forward voltage drops and less power dissipation than diodes, resulting in more efficient operation especially in the case of DC converters providing high current and/or low voltage outputs.

In order to further improve efficiency, and to reduce potential radio frequency interference (RFI) and electromagnetic interference (EMI), it is desirable for switches in DC converters to be operated as much as possible with zero voltage switching (ZVS) or zero current switching (ZCS). To this end it is known to incorporate quasi-resonant circuits in some DC converters, controlling the timing of switch closing and/or opening to achieve ZVS or ZCS.

For example, Jain U.S. Pat. No. 5,159,541 dated Oct. 27, 1992 and entitled "Asymmetrical Pulse Width Modulated Resonant DC/DC Converter" describes a DC converter in which a chopper comprising two switches is coupled via a resonant circuit, including a series capacitor, to a primary winding of a transformer, a secondary winding of the transformer being coupled via rectifiers to an output filter circuit. This patent also discusses various known forms of DC converters.

It is also known from Cuk et al. U.S. Pat. No. 4,184,197 dated Jan. 15, 1980 and entitled "DC-To-DC Switching Converter" to provide a so-called Cuk converter. The Cuk converter comprises a boost regulator and a buck regulator coupled in cascade, in which a series circuit comprising two inductors and a series capacitor between them is coupled between an input terminal and an inverted polarity output terminal. In an isolated form of the Cuk converter, the series capacitor is replaced by a transformer and two capacitors, the capacitors being in series with the primary and secondary windings of the transformer.

Despite many improvements in DC converters over many years, there remains a need for further improvements in many areas, including such areas as efficiency, simplicity of the converters and their switch control circuitry, versatility for providing for different input and/or output conditions, cost, and size.

SUMMARY OF THE INVENTION

According to one aspect of this invention there is provided a DC converter comprising a buck or boost regulator coupled between input terminals for a supply voltage and output terminals for a regulated output of the converter, the regulator including at least a first switch which is controllable for regulating said output, and a transformer, wherein the regulator comprises an input circuit coupled to the input terminals and having a first capacitor connected in series with a primary winding of the transformer, and an output circuit coupled to the output terminals and having a second capacitor connected in series with a secondary winding of the transformer, and wherein successive cycles of operation of the converter each comprise a phase of energy transfer via the transformer from the first capacitor to the second capacitor during a first state of said switch, and a phase of charge balancing between the capacitors during a second state of said switch.

In one embodiment of the invention, said first switch is connected in series with the first capacitor and primary winding between the input terminals, and the input circuit further comprises a second switch in parallel with the series-connected first capacitor and primary winding, the second switch being controlled in a complementary manner to the first switch. In another embodiment, the input circuit comprises four switches connected to the input terminals in a full bridge arrangement, the series-connected first capacitor and primary winding being connected in a diagonal of the bridge. In a further embodiment, the input circuit comprises two switches connected in series, and two capacitors connected in series, between the input terminals, the primary winding being connected between a junction between the two switches and a junction between said two capacitors, said two capacitors constituting said first capacitor connected in series with the primary winding.

In each case the output circuit can comprise an inductor connected in series with the second capacitor and secondary winding between the output terminals, a diode or switch in parallel with the series-connected second capacitor and secondary winding, and a capacitor coupled between the output terminals.

The transformer primary and secondary windings can be electrically isolated from one another to provide an isolated DC converter, or the transformer can be an autotransformer.

Another aspect of the invention provides a DC converter comprising: a transformer having a first winding and a second winding; first, second, and third controllable switches; first, second, and third capacitors; and an inductor; wherein the first winding, first capacitor, and first switch are coupled in series between a first pair of terminals; the second switch is coupled in parallel with the series-connected first winding and first capacitor; the second winding, second capacitor, and inductor are coupled in series between a second pair of terminals; the third switch is coupled in parallel with the series-connected second winding and second capacitor; and the third capacitor is coupled between one of the first and second pairs of terminals.

A further aspect of the invention provides a DC converter comprising a transformer having a first winding coupled in series with a first capacitor and a first controllable switch between a first pair of terminals, and a second winding coupled in series with a second capacitor and an inductor between a second pair of terminals; a second controllable switch coupled in parallel with the series-connected first winding and first capacitor; a diode coupled in parallel with the series-connected second winding and second capacitor; and a third capacitor coupled between one of the first and second pairs of terminals.

In each case the converter may also include a fourth capacitor coupled between the other of the first and second pairs of terminals.

In one embodiment, the first capacitor is constituted by two capacitors each connected between the first winding and a respective terminal of the first pair of terminals. Another embodiment of the converter includes two further controllable switches via which the first winding is connected to respective terminals of the first pair of terminals.

Conveniently, each controllable switch comprises a semiconductor switch having a reverse parallel diode, and the diode coupled in parallel with the series-connected second winding and second capacitor is constituted by a reverse parallel diode of a further controllable semiconductor switch.

A further aspect of the invention provides a converter comprising: a first switch, a first capacitor, and a first winding of a transformer coupled in series between a first pair of terminals; a second switch coupled in parallel with the series-connected first capacitor and first winding; a second winding of the transformer, a second capacitor, and an inductor coupled in series between a second pair of terminals; a unidirectionally conductive device or a third switch coupled in parallel with the series-connected second winding and second capacitor; a third capacitor coupled between the first or the second pair of terminals; and a circuit for controlling the switches, the first and second switches being controlled so that they are not simultaneously conductive.

At least one of the switches can comprise a bidirectional switch. The transformer windings can be electrically isolated from one another to provide an isolated converter, or the transformer can comprise an autotransformer.

BRIEF DESCRIPTION OF THE DRAWINGS

The invention will be further understood from the following description by way of example with reference to the accompanying drawings, in which the same references are used in different figures to denote similar elements and in which.

DETAILED DESCRIPTION

Figure 1:
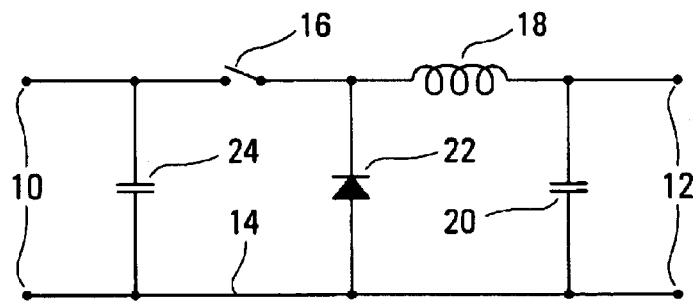
FIG. 1 schematically illustrates a known buck regulator.

Referring to the drawings, FIG. 1 illustrates a known buck regulator or forward converter, having two input terminals 10 for a DC supply voltage and two output terminals 12 at which it produces a DC output voltage which is less than the supply voltage. A common path 14 directly connects one of the terminals 10 to one of the terminals 12. The buck regulator of FIG. 1 comprises a switch 16 and an inductor 18 connected in series between the other of the input terminals 10 and the other of the output terminals 12, an output capacitor 20 connected between the two output terminals 12, a so-called freewheel diode 22 connected between the common path 14 and a junction between the switch 16 and the inductor 18, and an (optional but generally provided) input capacitor 24 connected between the two input terminals 10. The switch 16 is controlled by a control circuit (not shown) to open and close at a desired operating frequency and with a duty cycle that determines a ratio of the supply voltage to the output voltage.

As is well known in the art, when the switch 16 is closed, current from a DC supply connected to the input terminals 10 supplies a load connected to the output terminals 12 and stores energy in the inductor 18, and current flow in the inductor 18 is maintained via the diode 22 when the switch 16 is open, the capacitors 24 and 20 providing voltage smoothing at the input and output terminals respectively.

Figure 2:
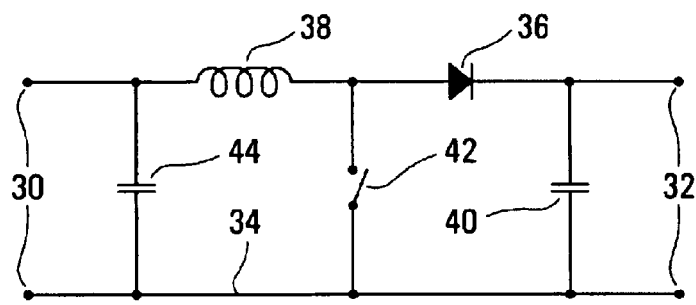
FIG. 2 schematically illustrates a known boost regulator.

FIG. 2 illustrates a known boost regulator or flyback converter, having two input terminals 30 for a DC supply voltage and two output terminals 32 at which it produces a DC output voltage which is greater than the supply voltage. A common path 34 directly connects one of the terminals 30 to one of the terminals 32. The boost regulator of FIG. 2 comprises an inductor 38 and a diode 36 connected in series between the other of the input terminals 30 and the other of the output terminals 32, an output capacitor 40 connected between the two output terminals 32, a switch 42 connected between the common path 14 and a junction between the inductor 38 and the diode 36, and an (optional but generally provided) input capacitor 44 connected between the two input terminals 30.

In the boost regulator of FIG. 2, the switch 42 is controlled by a control circuit (not shown) to open and close at a desired operating frequency and with a duty cycle that determines a ratio of the supply voltage to the output voltage. When the switch 42 is closed, current from a DC supply connected to the input terminals 30 stores energy in the inductor 38, and when the switch 42 is open current flow in the inductor 38 is maintained via the diode 36 to supply current to a load connected to the output terminals 32, the capacitors 44 and 40 providing smoothing at the input and output terminals respectively.

It is known that in the buck and boost regulators of FIGS. 1 and 2 the diodes 22 and 36 can be replaced by switches operated in a complementary manner to the switches 16 and 42 respectively. With such replacement, it can be seen that the topology of the boost regulator of FIG. 2 is the reverse of that of the buck regulator of FIG. 1. In other words, with replacement of the diode 22 in FIG. 1 by a switch, the circuit can operate as a buck regulator as described above, or as a boost regulator with the terminals 12 constituting the input terminals and the terminals 10 constituting the output terminals.

The regulators or converters of FIGS. 1 and 2 have a DC path between their input and output terminals, i.e. they are not isolated. A DC transformer, constituted by a transformer and a rectifier, can be added to either converter to produce an isolated DC converter, and a turns ratio between primary and secondary windings of the transformer can be selected to provide an arbitrary relationship between the input and output voltages.

Figure 3:
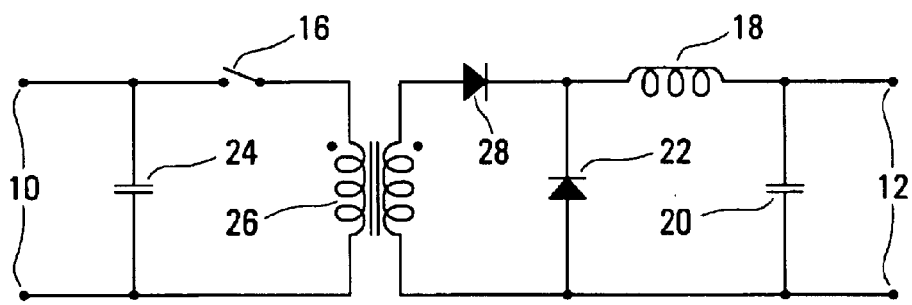
FIG. 3 schematically illustrates a basic form, without transformer reset, of a known single-ended forward converter.

FIG. 3 illustrates a basic form of a so-called single-ended forward converter, which comprises a buck regulator or forward converter as shown in FIG. 1 including a transformer 26 and a rectifier diode 28. Dots adjacent the transformer windings indicate the relative senses of these windings in conventional manner. The transformer 26 provides isolation between the input and output parts of the converter, so that there is no common path 14 or other DC connection between the input terminals 10 and the output terminals 12, the transformer having its primary winding connected in series with the switch 16 to the input terminals 10, and having its secondary winding connected in series with the rectifier diode 28 and the inductor 18 to the output terminals 12. Except for the isolation and any voltage transformation provided by the transformer 26, and rectification provided by the diode 28, the single-ended forward converter of FIG. 3 operates in the same manner as the buck regulator of FIG. 1.

As is well known, the basic form of single-ended forward converter shown in FIG. 3 must be supplemented by additional means to reset the transformer core in each switching cycle of the switch 16, in order to prevent magnetic saturation of the transformer 26. Various ways in which this can be done, for example involving a dissipative network, an additional transformer winding, and/or an additional switch, etc., are known and are not described here.

Figure 4:
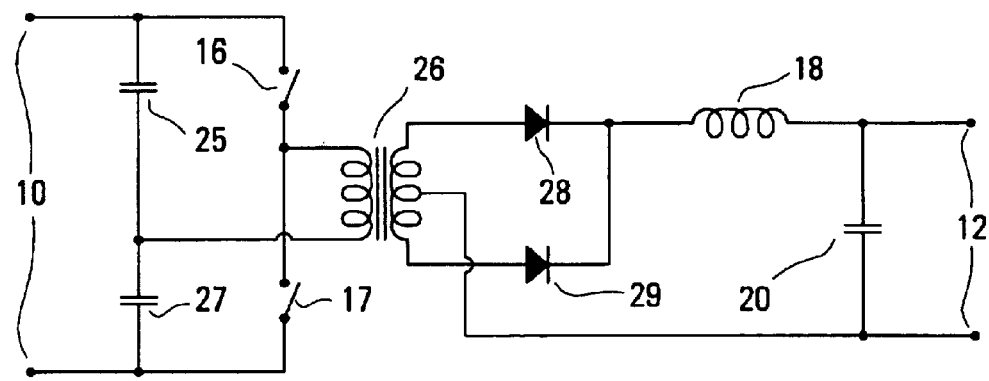
FIG. 4 schematically illustrates a known half-bridge DC converter.
Figure 5:
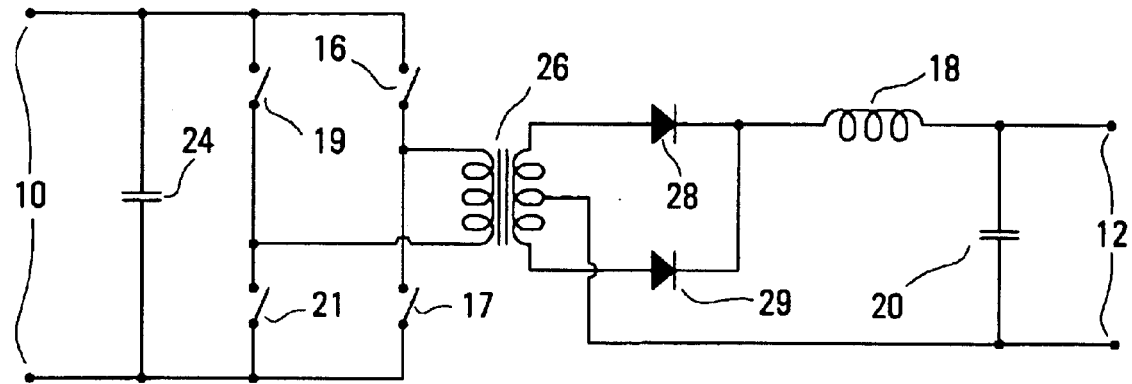
FIG. 5 schematically illustrates a known full-bridge DC converter.

FIGS. 4 and 5 illustrate further known isolated DC converters based on the buck regulator of FIG. 1, referred to as half bridge and full bridge converters respectively.

In the half bridge converter of FIG. 4, a first end of the primary winding of the transformer 26 is coupled to each of the two input terminals 10 via a respective one of two switches 16 and 17 which are operated in a manner complementary to one another, and a second end of the primary winding of the transformer 26 is coupled to each of the two input terminals via a respective one of two capacitors 25 and 27 which together constitute the input capacitor 24. Thus the switches 16 and 17 and the capacitors 25 and 27 form a bridge connected to the input terminals 10 and having the primary winding of the transformer 26 connected to its diagonal.

The full bridge converter of FIG. 5 is similar to the half bridge converter of FIG. 4, except that the input capacitor 24 is connected between the input terminals 10 as described above, and the second end of the primary winding of the transformer 26 is coupled to the two input terminals by respective further switches 19 and 21. Thus the switches 16, 17, 19, and 21 form a bridge connected to the input terminals 10 and having the primary winding of the transformer 26 connected to its diagonal. In this case the switch 21 is operated in synchronism with the switch 16, and complementary to this the switch 19 is operated in synchronism with the switch 17.

The converters of FIGS. 4 and 5 have the same circuit on the output side of the transformer 26, the secondary winding of which has a center tap connected to one of the two output terminals 12. The ends of the secondary winding of the transformer 26 are coupled, via respective diodes 28 and 29 forming a full-wave rectifier and eliminating the freewheel diode 22 in the single-ended forward converter of FIG. 3, and via the inductor 18 to the other of the two output terminals 12, the output capacitor 20 again being connected between the output terminals 12.

Instead of a center-tapped secondary winding and two rectifier diodes as shown in FIGS. 4 and 5, each of these converters can have an untapped transformer secondary winding and a bridge rectifier, but this involves a disadvantage of an extra diode voltage drop in the output circuit.

Figure 6:
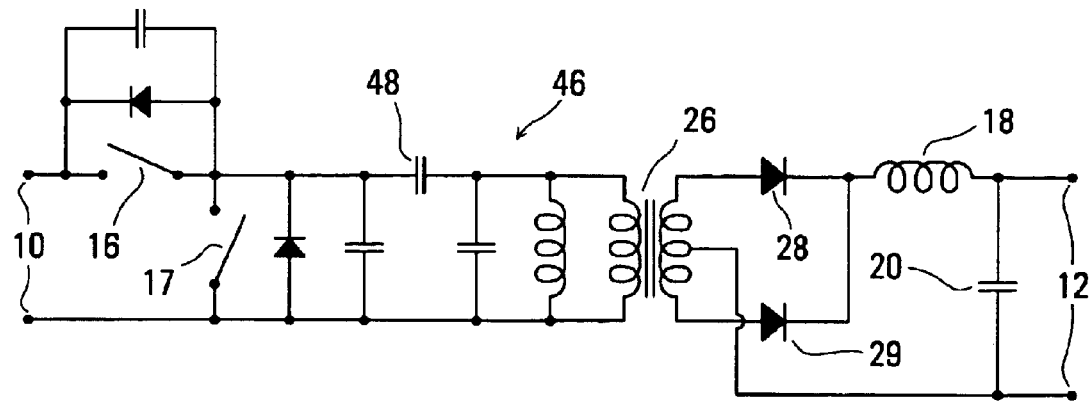
FIG. 6 schematically illustrates another known DC converter.
Figure 7:
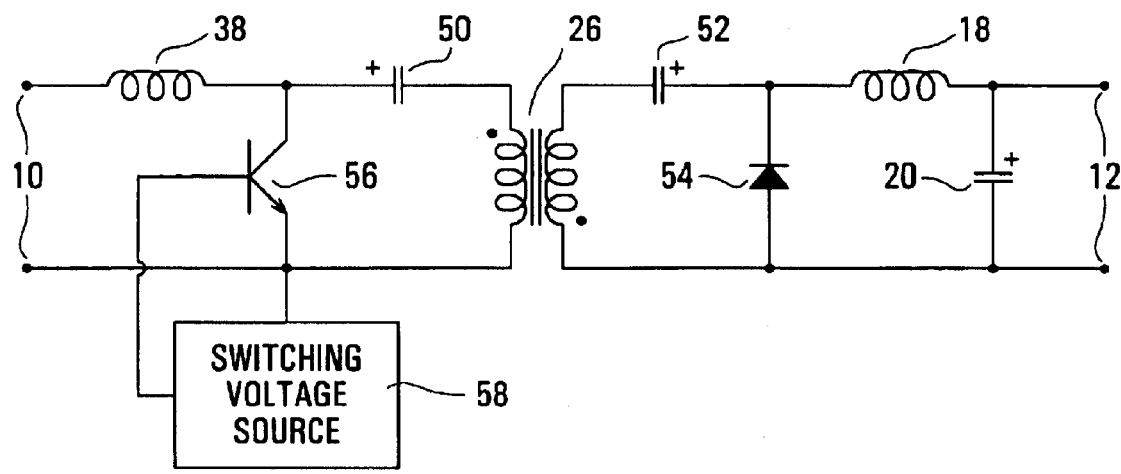
FIG. 7 schematically illustrates a known isolated form of a Cuk converter.

FIG. 6 illustrates another DC converter which is known from FIG. 7 of Jain U.S. Pat. No. 5,159,541 referred to above. The output side of this DC converter is the same as shown in FIGS. 4 and 5 and described above.

In the DC converter of FIG. 6, the input terminals 10 are connected to two series-connected switches 16 and 17, which are operated in a manner complementary to one another, each switch having in parallel with it a respective reverse diode (which may be constituted by a body diode of a MOSFET constituting the switch) and a respective snubber capacitor. A junction between the switches is coupled to the primary winding of the transformer 26 by a resonant circuit 46 including a series capacitor 48. In addition to performing its function in the resonant circuit 46, the capacitor 48 blocks DC from the transformer 26.

The converters illustrated in FIGS. 3 to 6 are all one-directional; the presence of the rectifier diode(s) prevents them from being operated in a reverse direction with the terminals 12 used for a DC supply and the terminals 10 used to produce a regulated output voltage.

In converters such as those of FIGS. 4 to 6, with switches such as the switches 16 and 17 connected in series between the input terminals 10, the switch control circuit (not shown) typically provides for delayed turn-on of these switches to prevent simultaneous conduction and hence a short of the DC supply connected to the input terminals 10. In other words, instead of each switch being turned on at the same time that the other switch is turned off, each switch is turned on a short time after the other switch is turned off, so that the two switches are never simultaneously conductive or partly conductive.

FIG. 7 illustrates a Cuk converter which is known from FIG. 11 of Cuk et al. U.S. Pat. No. 4,184,197 referred to above. As is known in the art, a Cuk converter comprises a boost regulator cascaded with a buck regulator, with a capacitor connected in series with the inductors of the regulators and the regulator switching rearranged accordingly, and a consequent inversion of the output polarity. In the isolated form of the Cuk converter shown in FIG. 7, the series capacitor is divided into two capacitors 50 and 52 which are connected in series with the primary and secondary windings, respectively, of the isolating transformer 26. Dots adjacent the transformer windings indicate the relative senses of these in conventional manner, and it can be seen from FIG. 7 that the polarity of the secondary winding is reversed (and consequently the polarities of all of the components of the output circuit of the converter are likewise reversed from what would otherwise be the case) to re-invert the output polarity.

In addition to the input terminals 10, the output terminals 12, the isolating transformer 26, and the series capacitors 50 and 52 which accordingly have relative polarities as shown in FIG. 7, the converter of FIG. 7 comprises the boost regulator or input inductor 38 connected as in FIG. 2, the buck regulator or output inductor 18 and output capacitor 20 connected as in FIG. 1, a diode 54 connected in the output circuit with the polarity shown, and a switch constituted by a bipolar transistor 56 connected in the input circuit and controlled by a switching voltage source 58.

In operation of the converter of FIG. 7, when the transistor 56 is not conducting, the capacitor 50 is charged, with the polarity shown, via the input inductor 38 and the primary winding of the transformer 26, and a voltage induced in the secondary winding of the transformer forward biases the diode 54 and charges the capacitor 52 with the polarity shown, while output current to a load is supplied via the diode 54 and the output inductor 18 with smoothing by the output capacitor 20. When the transistor 56 conducts, the capacitor 50 discharges via this transistor and the primary winding of the transformer 26, inducing in the secondary winding a voltage which is additive to (i.e. has the same polarity as) the capacitor 52, reverse biasing the diode 54 and supplying current to the output inductor 18.

Thus in the converter of FIG. 7, in one switching phase, when the transistor 56 is non-conductive, the capacitors 50 and 52 are both charged from the input supply, and in the other switching phase, when the transistor 56 is conductive, the capacitors 50 and 52 are both discharged to the output.

While the Cuk converter can provide various benefits (including operation in either direction) as described in U.S. Pat. No. 4,184,197, it also has disadvantages. For example, this converter requires the two inductors 18 and 38, and the inductor 38 increases voltage stress for the switch or transistor 56. In addition, using a synchronous rectifier (a controlled transistor) in known manner for the diode 54 as is desirable especially for a converter providing a relatively low output voltage, the turn-on and turn-off times must be controlled precisely.

As is well known, each of the converter switches can be conveniently constituted by a MOSFET, which has a so-called body diode effectively in parallel with its controlled source-drain path. Thus a MOSFET typically provides a switch which in one state provides a closed path and in another state provides a path which conducts in one direction but not in the other direction. In the embodiment of the invention described below with reference to FIG. 8, this characteristic is used to advantage, and the respective switches are accordingly illustrated in FIG. 8 as comprising a diode in parallel with the switch. However, it can be appreciated that this need not be the case, and that other types of switches with or without internal or external parallel diodes can be used to suit particular conditions that may be required.

In addition, it is well known that each such switch has a small capacitance associated with it, for example the drain-source capacitance of a MOSFET used to form the switch, which can be represented as a capacitor in parallel with the switch. It should be appreciated that these switch capacitances are much less than the capacitances of the snubber capacitors in parallel with the switches 16 and 17 in the DC converter of FIG. 6. For example, the Jain patent referred to above states that "a large value of snubber capacitor" is employed across the switch 16.

Figure 8:
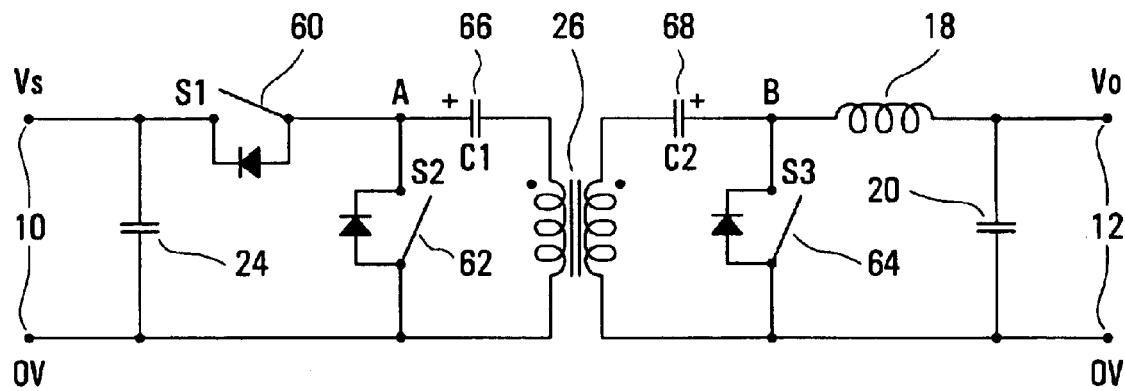
FIG. 8 schematically illustrates a DC converter in accordance with one embodiment of this invention.

Referring to FIG. 8, there is schematically illustrated an isolated DC converter in accordance with an embodiment of the invention. Using the same references as above to represent corresponding parts, the converter of FIG. 8 comprises two input terminals 10, an input capacitor 24 connected between the input terminals 10, two output terminals 12, an output capacitor 20 connected between the output terminals 12, a transformer 26 having primary and secondary windings, and an inductor 18.

It is observed that as described further below the converter of FIG. 8 is bidirectional, so that instead the terminals 10 can constitute output terminals, the capacitor 24 can constitute an output capacitor, the terminals 12 can constitute input terminals, the capacitor 20 can constitute an input capacitor, and the transformer primary and secondary windings are effectively interchanged. However, for clarity and simplicity the above terminology, assuming the terminals 10 to be input terminals and the terminals 12 to be output terminals, is generally retained in this description.

The converter of FIG. 8 also includes three switches 60, 62, and 64, each of which is represented by a switch and a parallel diode as indicated above, and two capacitors 66 and 68, also designated in the drawing and referred to below as capacitors C1 and C2 respectively. The switches 60, 62, and 64 are also designated as switches S1, S2, and S3 respectively in the drawing and in the description below. A control circuit (not shown in FIG. 8) is also provided for controlling the switches in the manner described below.

In the converter of FIG. 8, the primary winding of the transformer 26 has a first end connected to one of the two input terminals 10, and a second end coupled via the C1 capacitor 66 in series with the S1 switch 60 to the other of the two input terminals 10. The S2 switch 62 is connected between the first end of the primary winding of the transformer 26 and a junction point A between the S1 switch 60 and the C1 capacitor 66. Consequently the S1 and S2 switches 60 and 62 are connected in series between the two input terminals 10, and are controlled with delayed turn-on to avoid simultaneous conduction as discussed above.

Also, in the converter of FIG. 8, the secondary winding of the transformer 26 has a first end connected to one of the two output terminals 12, and a second end coupled via the C2 capacitor 68 in series with the inductor 18 to the other of the two output terminals 12. The S3 switch 64 is connected between the first end of the secondary winding of the transformer 26 and a junction point B between the C2 capacitor 68 and the inductor 18.

In FIG. 8, for a positive DC voltage supply Vs to the upper one of the two input terminals 10 which is connected to the S1 switch 60, dots adjacent the transformer windings indicate the relative senses of these windings in conventional manner for producing a positive DC output voltage Vo at the upper one of the two output terminals 12 which is connected to the inductor 18, and the diodes of the switches 60, 62, and 64 have the polarities shown. Corresponding polarities of voltages of the capacitors 66 and 68 are represented by + symbols adjacent to the left-hand side of the capacitor 66 and adjacent the right-hand side of the capacitor 68, i.e. at the connections of these capacitors to the junction points A and B, respectively. In the following description, it is assumed that the lower input and output terminals each have a relative voltage of zero volts, as illustrated.

The operation of the converter of FIG. 8 is described below with additional reference to FIG. 9, which illustrates waveforms which can occur in such operation. It is assumed for convenience in this description that the transformer 26 has a turns ratio of 1:1, so that the transformer 26 provides isolation but no voltage transformation, but this need not be the case and the transformer 26 can have an arbitrary turns ratio between its primary and secondary windings. In addition, the description here assumes a forward energy transfer via the converter from a DC voltage supply connected to the input terminals 10 to a load connected to the output terminals 12, with a duty cycle of the order of 50% for example, but as already indicated the converter can also operate to transfer energy in the reverse direction, and the duty cycle can be varied and controlled to suit particular conditions.

Figure 9:
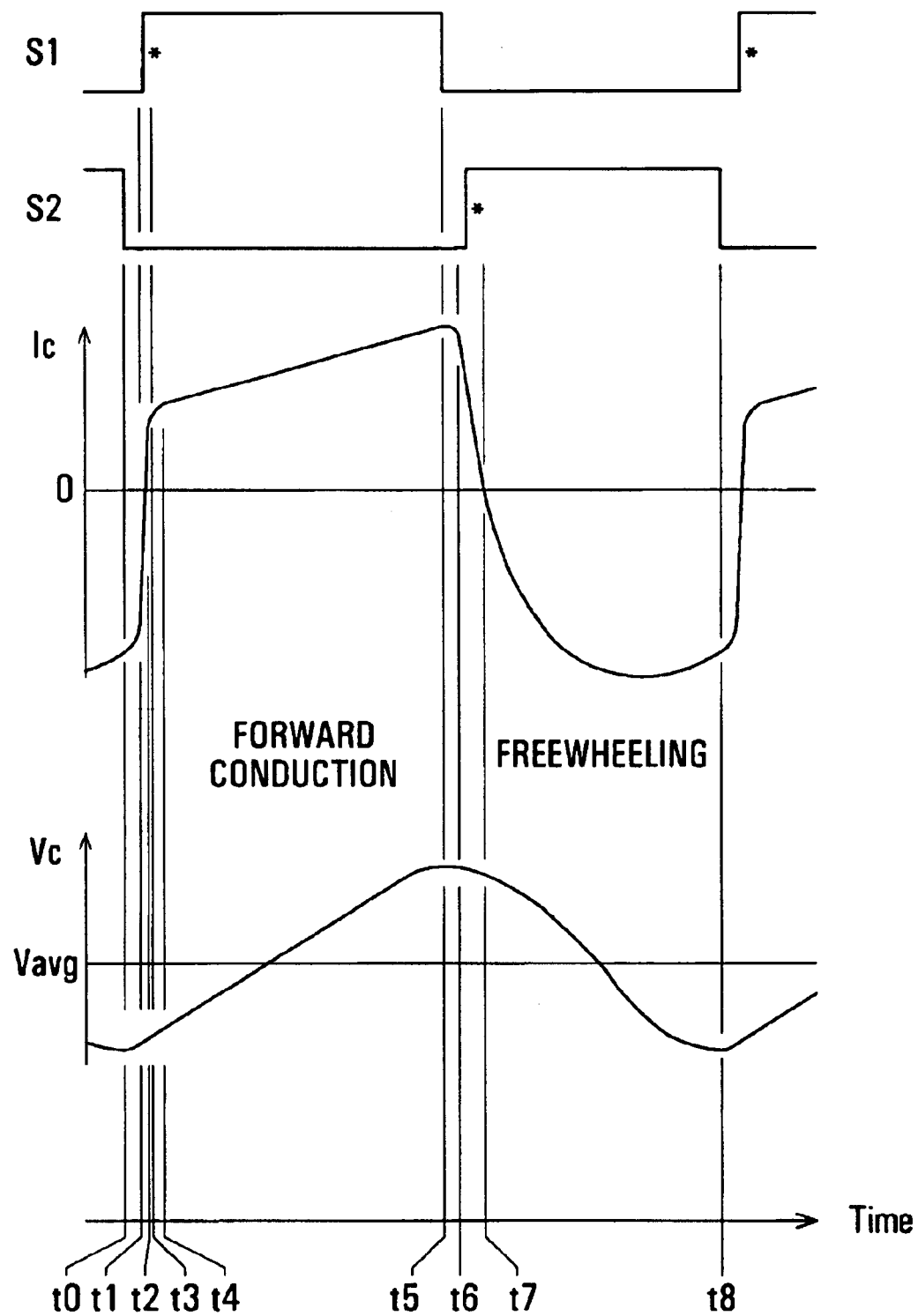
FIG. 9 diagrammatically illustrates waveforms which can occur in operation of the DC converter of FIG. 8.

In FIG. 9, an upper waveform labelled S1 indicates a control waveform for the S1 switch 60, the switch being closed when the S1 waveform is high. A waveform labelled S2 indicates a generally complementary (with turn-on delays as discussed above) control waveform for the S2 switch 62, this switch being closed when the S2 waveform is high. The S3 switch 64 is controlled to be closed and opened approximately in synchronism with the switch S2, with possible variations as described further below, by the S2 waveform or by another switch control waveform (not shown). These switch control waveforms are produced in generally known manner by the switch control circuit.

Asterisks in FIG. 9 adjacent rising edges of the S1 and S2 waveforms indicate the delayed control for turn-on (closing) of the switches as discussed above to prevent simultaneous conduction of the S1 switch 60 and the S2 switch 62. Thus the S1 switch 60 is closed a short time after the S2 switch 60 is opened, and the S2 switch 62 is closed a short time after the S1 switch 60 is opened. For convenience, it is assumed here that the S1 and S2 switch control waveforms are substantially periodic at a constant operating frequency of the converter, for example of the order of 200 kHz, but this need not be the case and the converter can instead be operated at a variable switching frequency.

FIG. 9 also illustrates a current waveform Ic which represents current flow via the capacitor 66, relative to a zero current value represented by a horizontal line, and a voltage waveform Vc which represents a voltage to which the capacitor 66 is charged, relative to an average voltage Vavg of this capacitor represented by a horizontal line. Further, FIG. 9 illustrates that each operating cycle of the converter comprises a forward conduction interval and a freewheeling interval, generally corresponding to the intervals during which the S1 switch 60 is respectively closed and open, and indicates time instants t0 to t8 which are referred to in the following description.

During the forward conduction interval, with the S1 switch 60 closed and the S2 and S3 switches 62 and 64 open, between times t4 and t5 a supply current Is flows from the supply voltage Vs at the input terminals 10 via the closed S1 switch, the C1 capacitor 66, and the primary winding of the transformer 26. This supplies magnetizing energy to the transformer 26 (i.e. stores energy in a magnetizing inductance Lm of the transformer 26) and increases charge of the C1 capacitor 66 with the polarity shown. A corresponding current Io flows via the secondary winding of the transformer 26, the C2 capacitor 68, and the inductor 18, storing energy in the inductance Lo of the inductor 18, supplying a load connected to the output terminals 12, and decreasing charge of the C2 capacitor 68, with output smoothing provided by the capacitor 20. As the inductance Lo is relatively large, the inductor 18 acts as a constant current load for the buck regulation provided by the converter, so that the current Io, and hence also the current Ic (as shown in FIG. 9) constituted between times t4 and t5 by the supply current Is, rises substantially linearly.

At the time t5, the S1 switch 60 is opened. The time for which the S1 switch 60 is closed, i.e. the duty cycle of the converter, can be varied in known manner, for example using a voltage-sensing and/or current-sensing feedback loop (not shown) to provide desired regulation of the output of the converter.

Between the times t5 and t6, the capacitances of the S1 and S2 switches 60 and 62 are discharged by resonating with the inductance Lo of the inductor 18, with which they are coupled via the C1 and C2 capacitors 66 and 68 and the transformer 26. The capacitors 66 and 68 are in series with, and are much larger than, the switch capacitances, so that they have negligible effect on this resonance. Consequently, the voltage at the junction point A falls. Current in the primary winding of the transformer 26 is maintained as a result of the leakage inductance Ll of the transformer. (In an equivalent circuit of the transformer, the leakage inductance of the transformer may be regarded as an inductance in series with an ideal primary winding of the transformer, and the magnetizing inductance Lm may be regarded as an inductance in parallel with this ideal primary winding.) At the time t6 the voltage at the junction point A becomes negative and the body diode of the S2 switch 62 conducts, positive current Ic continuing to flow, until the time t7, clockwise in a loop including the C1 capacitor 66, leakage inductance Ll and primary winding of the transformer 26, and the S2 switch diode. As shown in FIG. 9, the S2 switch 62 is closed under zero voltage conditions (because its diode is conducting) during the period between the times t6 and t7. The S3 switch 64 is also closed during this same period between the times t6 and t7, for example simultaneously with the closing of the S2 switch 62.

With the switches S2 and S3 closed, the C1 capacitor 66 is connected directly across the primary winding of the transformer, and the C2 capacitor 68 is connected directly across the secondary winding of the transformer 26. Consequently, the charges of these capacitors become balanced or equalized by resonance of these capacitances with the leakage inductance Ll of the transformer 26, this leakage inductance also serving to avoid sudden voltage and current spikes or transitions. This resonance occurs during the freewheeling interval between the times t7 and t8, with currents in the transformer primary and secondary windings reversed (i.e. the current flow is counter-clockwise in each of the primary and secondary loops as shown in FIG. 8, and the current Ic in FIG. 9 is negative). As shown in FIG. 9, between the times t7 and t8 the negative current Ic changes in a generally sinusoidal manner, with a quasi-resonant frequency ω given by $\omega=1/\sqrt{L1C1C2/(C1+C2)}$. The parameters of the converter are selected so that the freewheeling interval is equal to or greater than one quarter of a period at this frequency, in order for charge balancing of the capacitors 66 and 68 to be completed within the freewheeling interval as is desired for proper control of the converter. During the freewheeling interval, magnetic energy stored in the transformer 26 is returned to the C1 and C2 capacitors 66 and 68 (i.e. the transformer is reset), and the load is supplied by magnetic energy stored in the output inductor 18.

At the time t8 the S2 switch 62 is opened; this corresponds for the next cycle to the time t0 for the current cycle, and the following description continues with reference to timing from the time t0. Thus the S2 switch 62 is opened at the time t0. The S3 switch 64 may be opened at the same time t0, or subsequently up to the time t3. A delayed opening of the S3 switch 64 relative to the opening of the S2 switch 62 may be desirable in order to avoid reverse recovery charge flow, in the event that the output current Io exceeds the reversing current in the C2 capacitor 68, if the S3 switch 64 is opened before the output current path is re-established via this capacitor.

On opening of the S2 switch 62 at the time t0, the negative current Ic continues to flow via the primary winding of the transformer 26, the C1 capacitor 66, and the diode of the S1 switch 60 to return energy to the input capacitor 24, with a corresponding secondary winding current via the diode of the S3 switch 64 and the C2 capacitor 68, charging the switch capacitances of the S1 and S2 switches with resonance with the leakage inductance Ll of the transformer until the time t1, and then with a steep linear ramp until the time t3. The current Ic reverses and becomes positive again during this period at the time t2, the S1 switch 60 being closed under zero voltage conditions between the times t1 and t2. At the time t3, this being the latest time for closing of the S3 switch 64, the body diode of this switch ceases conducting, and there is a smooth transition to the linear ramp, starting at the time t4, of the forward conduction interval as described above.

It can be appreciated from the above description that the leakage inductance of the transformer, which can if desired be supplemented by extra inductance in series with the primary winding and/or the secondary winding of the transformer 26, plays a significant part, in conjunction with the switch capacitances, in ensuring the establishment of zero voltage conditions for switching of the switches and smooth transitions between successive phases of the operating cycle of the converter.

In addition, it can be appreciated that the C1 and C2 capacitors 66 and 68 serve to block DC from the transformer 26, thereby avoiding transformer reset problems such as occur with conventional single-ended forward converters, and to couple energy from the primary side to the secondary side of the transformer without using any rectifier diode(s). In effect, the C1 capacitor 66 serves to block DC from the primary winding of the transformer, and the C2 capacitor 68 serves to restore DC for the output circuit on the secondary winding side of the transformer. It can be appreciated that the characteristics of these capacitors must be selected to provide the desired coupling of energy.

Consequently, the converter of FIG. 8 can equally be operated in the reverse direction, i.e. with the terminals 12 used as input terminals and the terminals 10 used as output terminals, with substantially the same control circuits.

It can be appreciated that, although the converter of FIG. 8 has some apparent similarities with the Cuk converter of FIG. 7, its topology and operation are very different. More particularly, the converter of FIG. 8 is a buck regulator (or boost regulator for the reverse direction), whereas the Cuk converter of FIG. 7 is a cascade of both a boost regulator and a buck regulator. Thus whereas the Cuk converter requires two inductors 18 and 38, the converter of FIG. 8 requires only one inductor 18. The output voltage inversion of the Cuk converter, compensated by the oppositely sensed secondary winding of the transformer 26 of this converter as shown in FIG. 7, is not present in the converter of FIG. 8 and reflects the different topology and operations of the converters.

More particularly, as described above with reference to FIG. 7, in the Cuk converter the capacitors 50 and 52 are both charged in one switching phase (when the transistor 56 is non-conductive) and are both discharged in another switching phase (when the transistor 56 is conductive). In contrast, as described above with reference to FIGS. 8 and 9, in the converter of FIG. 8 the C1 capacitor 66 is charged and the C2 capacitor 68 is discharged in one switching phase (when the S1 switch 60 is closed), and in the other switching phase (when the S1 switch 60 is open) there is a charge balancing between the C1 and C2 capacitors 66 and 68 by resonance with the leakage inductance of the transformer 26. Such charge balancing is not present in the Cuk converter of FIG. 7.

Furthermore, as described above the operation of the converter of FIG. 8 is such that the turn-on (closing) and turn-off (opening) times of the switches are relatively flexible. For example, as described above the S2 and S3 switches 62 and 64 can be closed at any time during the period from t6 to t7, the S3 switch 64 can be opened at any time during the period from t0 to t3, and the S1 switch 60 can be opened at any time during the period from t1 to t2. Such flexibility in the timing of the control of the switches provides a significant advantage compared with the precise timing required for synchronous rectifier switch operation in the Cuk converter of FIG. 7.

It can be appreciated that in the converter of FIG. 8 the capacitors 66 and 68 can both have the same capacitance or they can have different capacitances. If the transformer 26 has a primary-to-secondary turns ratio of 1:N, it can be appreciated that N can be less than, equal to, or greater than 1. As can be seen from FIG. 8, during the freewheeling interval the S2 and S3 switches 62 and 64 are closed so that the C1 and C2 capacitors are coupled directly across the primary winding and the secondary winding, respectively, of the transformer 26. In other words, the capacitance of the C2 capacitor 68, as reflected to the primary through the transformer 26, is in parallel with the C1 capacitor 66. (This again is different from the Cuk converter of FIG. 7, in which the capacitors 50 and 52 are coupled in series via the transformer 26.)

Representing the capacitance, voltage, and charge of the C1 capacitor 66 as $C_1$, $V_1$, and $Q_1$ respectively so that $Q_1 = C_1 V_1$, and the capacitance, voltage, and charge of the C2 capacitor 68 as $C_2$, $V_2$, and $Q_2$ respectively so that $Q_2 = C_2 V_2$, it can be seen that the converter of FIG. 8 is such that, after the charge balancing described above, $V_2/V_1 = N$ and $Q_2/Q_1 = NC_2/C_1$.

The above description with reference to FIGS. 8 and 9 relates to one particular embodiment of the invention, and it can be appreciated that the invention can apply to other forms of DC converter, with the C1 and C2 capacitors 66 and 68, or their equivalents, providing transfer of energy from an input circuit or primary winding side of a transformer to an output circuit or secondary winding side of the transformer, with DC blocking and DC restoration on the primary and secondary sides respectively, and without requiring any rectifier on the secondary side, the transfer of energy being controlled by appropriate control of one or more switches of the converter. Thus a DC converter in accordance with embodiments of this invention can have the form of a buck or boost regulator or derivative of either or both of these. Furthermore, as is known in the art of DC converters, switches can in some cases be replaced by diodes, and vice versa, and resonant circuits can be rearranged with equivalent results.

Figure 10A:
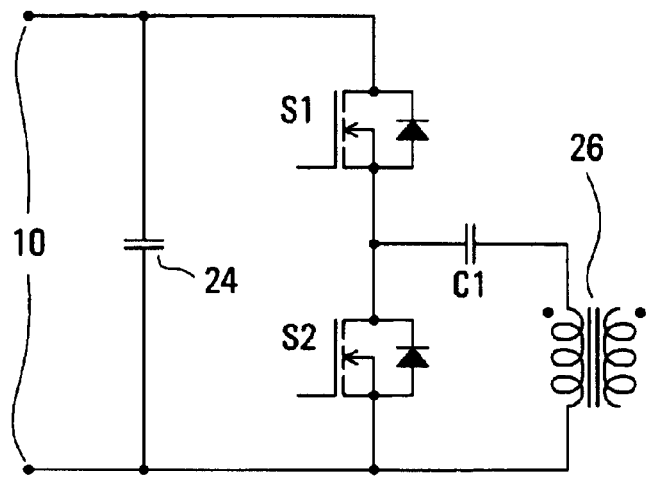
FIGS. 10A, 10B, and 10C schematically illustrate various forms of an input circuit of a DC converter in accordance with alternative embodiments of this invention.
Figure 10B:
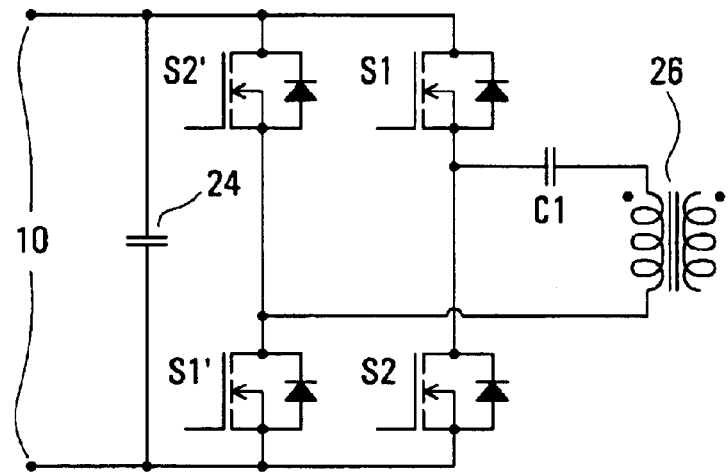
Figure 10C:
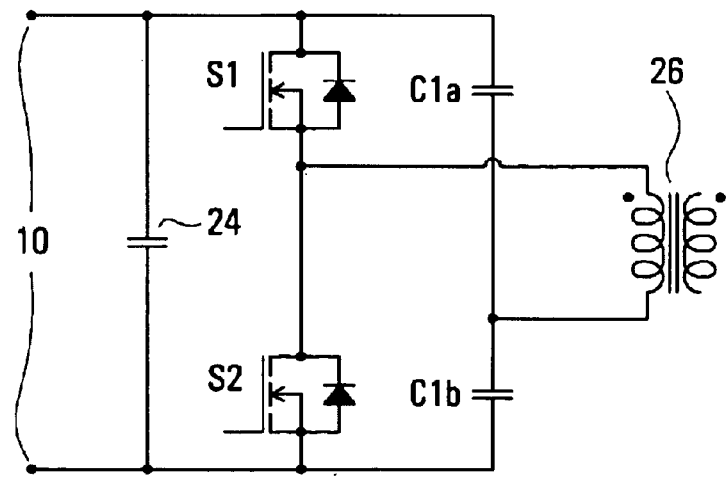
Figure 11A:
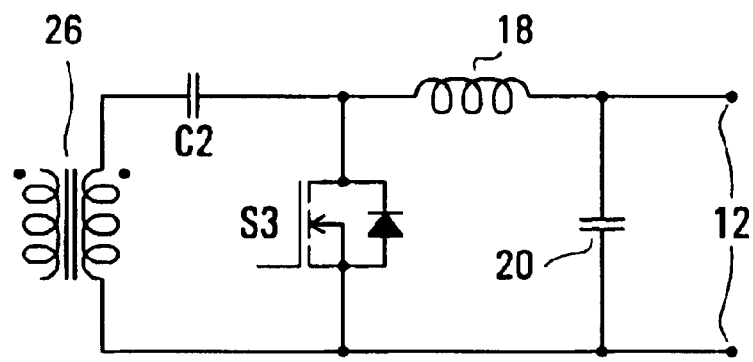
FIGS. 11A and 11B schematically illustrate different forms of an output circuit of a DC converter in accordance with alternative embodiments of this invention.
Figure 11B:
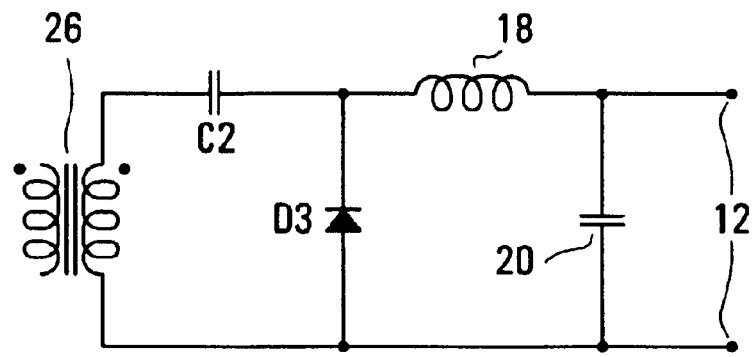
Figure 12:
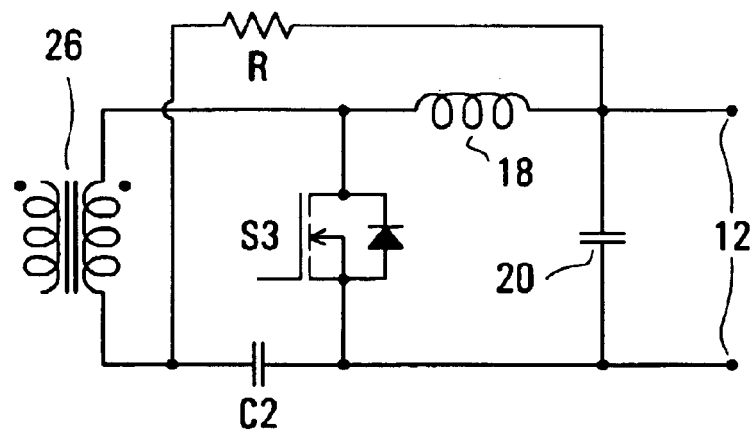
FIG. 12 schematically illustrates another output circuit of a DC converter in accordance with a further embodiment of this invention.

By way of example, FIGS. 10A, 10B, and 10C illustrate various forms of an input circuit of a DC converter in accordance with alternative embodiments of this invention, and FIGS. 11A, 11B, and 12 illustrate various forms of an output circuit of a DC converter in accordance with alternative embodiments of this invention, each of these drawings showing both windings of the transformer 26. Any of the input circuits can be used with any of the output circuits, and it can be appreciated that the input and output circuits can each have other forms from the examples illustrated.

FIG. 10A illustrates substantially the same input circuit as in the DC converter of FIG. 8, comprising the complementary switches S1 and S2 connected in series between the input terminals 10, and the optional but preferable input capacitor 24, with the junction between these switches coupled via the capacitor C1 to the primary winding of the transformer 26. In FIG. 10A, each of the switches S1 and S2 is constituted by a MOSFET including its body diode in parallel with the drain-source controlled path of the MOSFET, and switches in FIGS. 10B, 10C, 11A, and 12 are shown in a similar manner.

In the input circuit of FIG. 10B, the switches S1 and S2, input terminals 10, input capacitor 24, capacitor C1, and primary winding of the transformer 26 are connected in a similar manner to that of FIG. 10A, except that the other end of the primary winding is connected to a junction point between two additional switches S1' and S2' which are also connected in series between the input terminals 10. The four switches S1, S2, S1', and S2' thus form a full bridge input circuit, with the switches S1 and S1' in two opposite arms of the bridge being operated in synchronism with one another, and the switches S2 and S2' in the other two opposite arms of the bridge also being operated in synchronism with one another and complementary to the switches S1 and S1'.

In the input circuit of FIG. 10C, the switches S1 and S2, operated complementary to one another, are again connected in series between the input terminals 10, and the junction between these switches is connected to one end of the primary winding of the transformer 26. The other end of the primary winding is connected to a junction between capacitors C1*a* and C1*b* which are also connected in series between the input terminals 10. The two switches S1 and S2 and the two capacitors C1*a* and C1*b* thus form a half bridge input circuit, and the capacitors C1*a* and C1*b* also serve the function of the capacitor C1 as described above, in that the primary winding of the transformer 26 is connected alternately in series with each of these capacitors. It can be appreciated that, for the operating frequency of the DC converter, the input capacitor 24 and/or the DC supply to the input terminals 10 provide a very low impedance, so that for the high operating frequency of the DC converter the capacitors C1*a* and C1*b* are effectively connected in parallel with one another, and provide substantially the same function as the capacitor C1 as described above.

FIG. 11A illustrates substantially the same output circuit as in the DC converter of FIG. 8, comprising the capacitor C2 coupling the secondary winding of the transformer 26 to the MOSFET switch S3 and via the output inductor 18 to the output capacitor 20 and the output terminals 12. As described above, this arrangement provides a bidirectional DC converter.

The output circuit of FIG. 11B is the same as that of FIG. 11A, except that the MOSFET switch S3 is replaced by a diode D3, with the same polarity as that of the body diode of the MOSFET switch S3 in the output circuit of FIG. 11A. The operation of the output circuit of FIG. 11B is substantially the same as that of FIG. 11A as described above in relation to FIGS. 8 and 9. However, the polarity of the diode D3, and the absence of a controlled switch in parallel with it, makes this output circuit unidirectional, i.e. as illustrated this is necessarily an output circuit. The terminals 12 can be used as input terminals, and a converter using the circuit of FIG. 11B can be operated only in the reverse direction, if the polarity of the diode D3 is reversed from that shown in FIG. 11B.

FIG. 12 illustrates another alternative output circuit which is similar to that of FIG. 11A, except that the series order of the capacitor C2 and the secondary winding of the transformer 26 is reversed, so that the capacitor C2 has one connection to a 0V or ground-referenced one of the output terminals 12. In addition, a resistor R is connected between the other, non-grounded output terminal 12 and a junction between the capacitor C2 and the secondary winding of the transformer 26. The resistor R serves to damp the output filter formed by the inductor 18 and the output capacitor 20; in this circuit there is no direct current flow via this resistor R, so that no DC blocking capacitor is needed in series with this damping resistor, as would be necessary if the damping resistor were instead connected across the output terminals 12. A similar modification can be made to the output circuit of FIG. 11B, and such a modification may also be desirable in boost regulator arrangements of the converter in which the terminals 12 are used as input terminals.

Snubber circuits, each comprising a resistor in series with a capacitor, can optionally be connected in parallel each with a respective one of the switches of the DC converter.

Although each of the DC converters as described above includes the input capacitor 24, it can be appreciated that this may instead be incorporated into, or constituted by a low output impedance of, a voltage supply coupled to the input terminals 10, and accordingly this input capacitor may be omitted. Similarly, where the DC converter is operated in the reverse direction with the terminals 12 used as the input terminals, the capacitor 20 may instead be omitted.

It can be appreciated from the above description that a DC converter in accordance with an embodiment of the invention operates to transfer energy from the input circuit to the output circuit in a cyclic sequence. In each cycle, energy is transferred, optionally in either direction, between a voltage source/sink port (the input circuit as described above) and a current source/sink port (the output circuit as described above) via the coupling capacitors C1 and C2 in series with a magnetic device constituted by the transformer with its characteristic leakage inductance, and subsequently charge is balanced or equalized between the coupling capacitors C1 and C2 through the leakage inductance of the transformer. In each of these phases of the cycle, interruption of current flow causes energy of the leakage inductance of the transformer to discharge the parasitic capacity of the opposing switches of the converter, resulting in zero voltage turn-on of the switches. As a result of the charge balancing between the coupling capacitors C1 and C2, an impedance transformation occurs due to the coupling of DC energy to the output circuit, allowing a significant reduction in the turns count required of the transformer to produce a given output voltage with a given voltage-per-turn.

Other advantages and benefits of embodiments of the invention will be appreciated, by those of ordinary skill in the art, from this description. For example, it is observed that as described above there is DC restoration of the full core flux swing of the transformer, under the influence of both charge transfer and magnetizing current amplitudes, in each operating cycle of the DC converter. Consequently, core saturation can be avoided and peak flux amplitudes can be reduced, resulting in low transformer core losses and facilitating use of smaller transformer core structures.

Although the embodiments of the invention described above relate to a two-port (one input port and one output port) network operated in the first and second quadrants, i.e. the input and output voltages have the same polarity, with unipolar switches and bi-directional currents, it can be appreciated that the same principles may be applied to multi-port networks with plural input and/or output ports, as may be desirable in electronic systems requiring more than one supply voltage and/or redundant power sources. Furthermore, the unipolar switches described above may be replaced by bidirectional switches for additional operation between any of the input and output ports in the third and fourth quadrants, with appropriate control of the switches, for operation of the converter in applications such as for a variable bipolar DC regulator, audio power amplifier, telecommunications ringer, and with adjustable loads. In addition, with bipolar voltage sources the converter may be used in further applications such as for an isolating alternator, a wideband impedance translator, or for an AC/DC load-shedding link.

Figure 13:
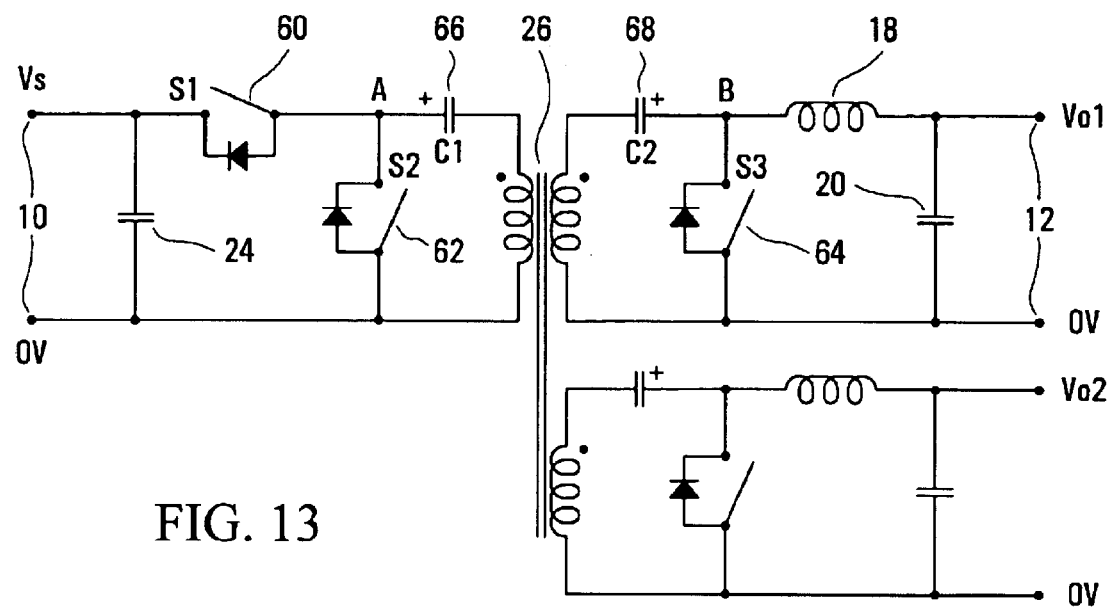
FIG. 13 schematically illustrates a DC converter, in accordance with another embodiment of this invention, providing a plurality of outputs.

By way of example, FIG. 13 illustrates the DC converter of FIG. 8 with the output circuit (transformer secondary winding, capacitor 68, switch 64, inductor 18, and capacitor 20) duplicated to provide two separate regulated output voltages Vo1 and Vo2. Further output circuits can be similarly added to provide additional output voltages.

Figure 14:
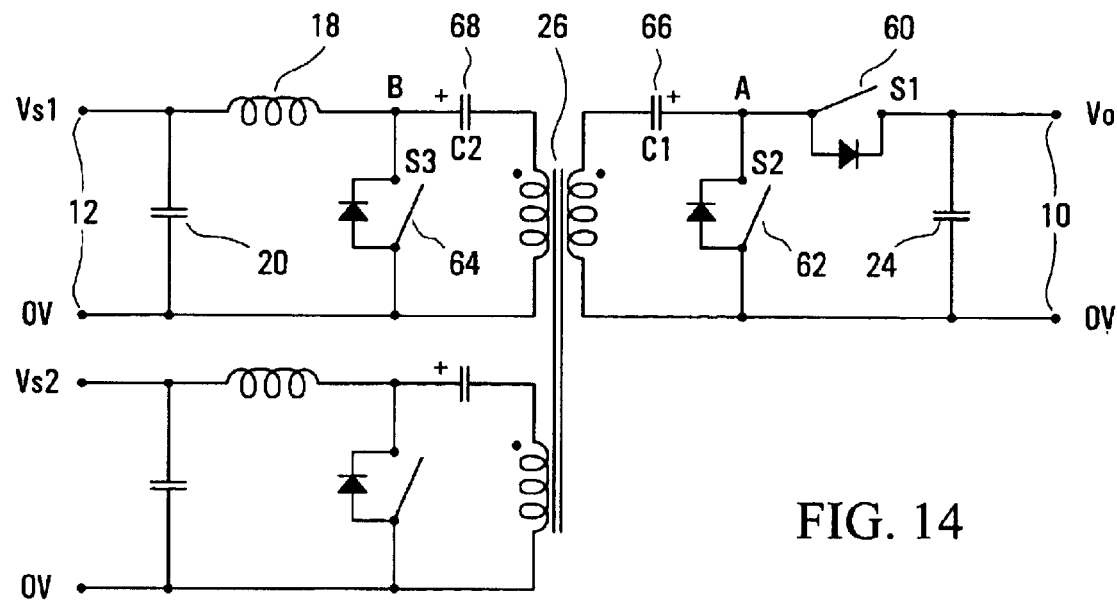
FIG. 14 schematically illustrates a DC converter, in accordance with a further embodiment of this invention, having a plurality of inputs.

FIG. 14 illustrates a reversed arrangement of the DC converter of FIG. 13, i.e. a boost regulator, having two inputs for input voltages Vs1 and Vs2; further input circuits can be similarly added to provide additional input voltages. Such an arrangement may be particularly desirable for providing a regulated output voltage from different input voltage sources, any one of which may be selected by switching (not shown). The inductor in each input circuit provides a current source from each input voltage, thereby avoiding voltage contention among the inputs. In this DC converter the output circuit, now constituted by the transformer secondary winding, capacitor 66, switches 60 and 62, and capacitor 24, can also be replicated to provide additional output voltages.

Figure 15:
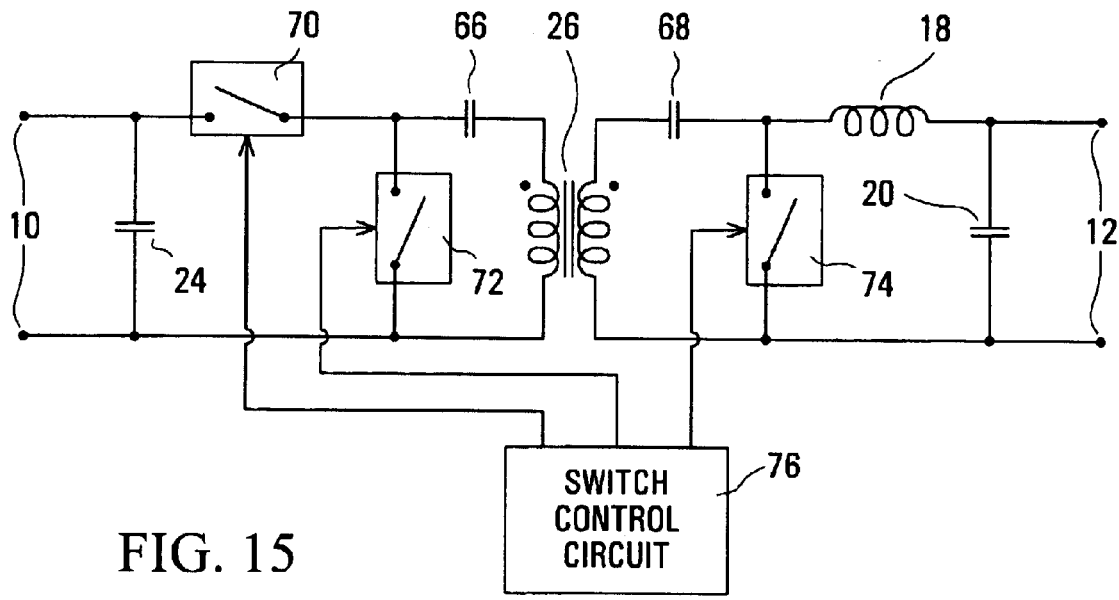
FIG. 15 schematically illustrates a general form of a DC converter in accordance with embodiments of the invention, which can use bidirectional switches for four-quadrant operation.

FIG. 15 illustrates a general form of a DC converter in accordance with embodiments of the invention, which can use bidirectional switches for four-quadrant operation. Referring to FIG. 15, the converter has a similar topology to that of FIG. 8, with input/output terminals 10 and 12, input/output capacitors 24 and 20 (of which the input capacitor is optional and may be omitted as described above), transformer 26 with capacitors 66 and 68 in series with its primary and secondary windings respectively, inductor 18, and switches 70, 72, and 74 which correspond to the switches 60, 62, and 64 respectively in FIG. 8 but are shown in FIG. 15 in a general manner. FIG. 15 also illustrates a switch control circuit 76 for controlling the switches 70, 72, and 74 for example in the manner already described above; this circuit may include isolated coupling (s) (not shown) in known manner to maintain full electrical isolation between the input and output circuits of the converter.

It can be appreciated from the description above that the switches 70, 72, and 74 can all be bidirectional or AC switches for fully bidirectional four-quadrant operation of the converter. Alternatively, for some applications of the converter one or more of these switches may be implemented as bidirectional switches and one or more others may be unidirectional switches or may be replaced by diodes as described above.

Although the converter of FIG. 15 is a DC converter, it can accordingly also be used for input and/or output voltages which may vary at a slow rate relative to the switching frequency of the converter.

For example, such a converter may be used to generate as its output voltage a telephone ringing signal, for example constituted by a 20 to 40 Hz sinusoidal waveform of 70 volts RMS superimposed on a DC voltage of −48 volts relative to ground or 0 volts, the switch control circuit 76 comparing a fraction of the output voltage with a low-level reference signal to provide a feedback error signal for controlling the switches 70, 72, and 74.

Figure 16A:
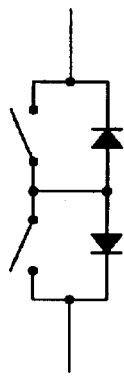
FIGS. 16A, 16B, and 16C schematically illustrate alternative forms of bidirectional switch which may be used in the DC converter of FIG. 15.
Figure 16B:
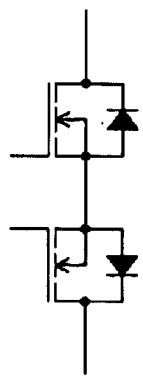
Figure 16C:
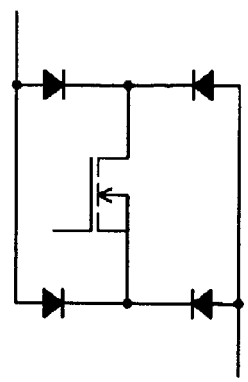

FIGS. 16A, 16B, and 16C illustrate alternative forms of bidirectional or AC switch which may be used in the DC converter of FIG. 15. In FIG. 16A, a bidirectional or AC switch is constituted by two back-to-back (i.e. oppositely-poled, series-connected) unidirectional switches and parallel diodes. Each unidirectional switch can have any desired form, for example it may comprise a bipolar transistor, IGBT (insulated gate bipolar transistor), silicon controlled rectifier, etc. It may alternatively comprise a MOSFET, resulting in the bidirectional or AC switch of FIG. 16B, in which the parallel diodes are constituted by the body diodes of the MOSFETs. In FIG. 16C, a unidirectional switch, in this case constituted by a MOSFET the body diode of which is not shown, is coupled in a diagonal of a diode bridge to constitute a bidirectional or AC switch. Other forms of bidirectional or AC switch may alternatively be used in the converter of FIG. 15.

In each of the embodiments of the invention described above, the transformer 26 has separate primary and secondary windings which are electrically isolated from one another, to provide in each case an isolated DC converter in which the input and output circuits are isolated from one another. However, the invention is also applicable to converters in which the input and output circuits are not isolated from one another. For example, in the DC converter of FIG. 8 a direct electrical connection can be made between the 0V ends of the primary and secondary windings of the transformer 26, removing the electrical isolation between the input and output circuits but otherwise not changing the converter or its operation.

More efficiently and conveniently, in the event that electrical isolation between the input and output circuits of the converter is not required, the transformer 26 can comprise an autotransformer, having a single tapped winding part of which is common to the primary and secondary circuits.

Figure 17:
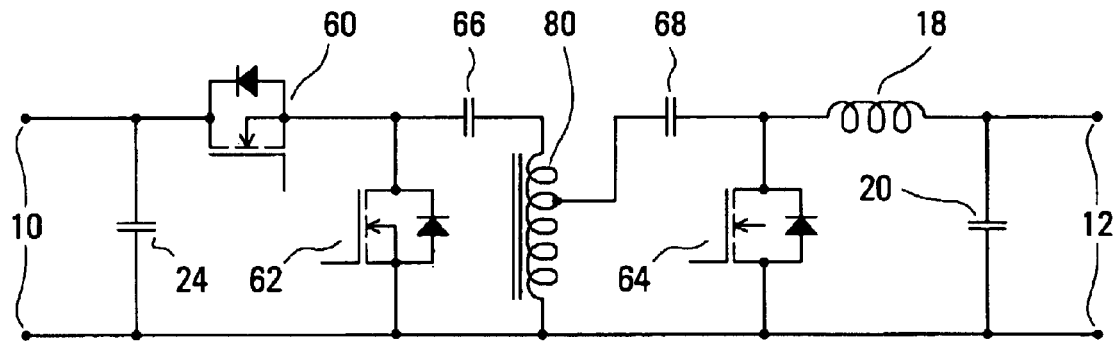
FIGS. 17 and 18 schematically illustrate further forms of DC converter in accordance with embodiments of the invention, using an autotransformer.
Figure 18:
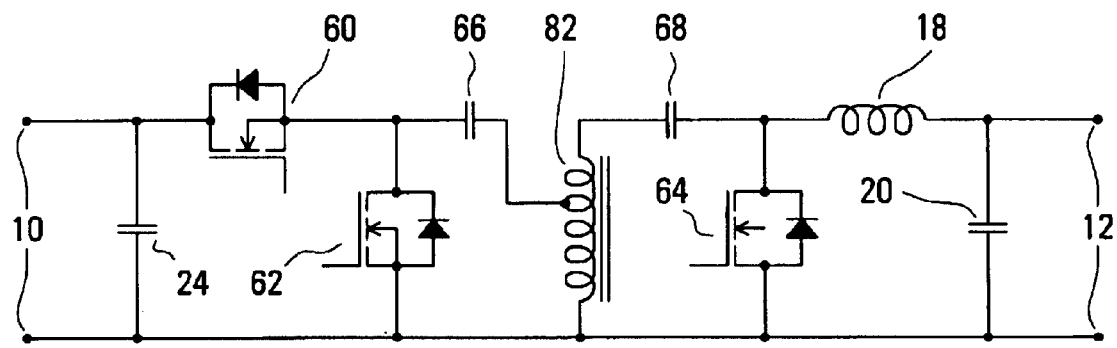

For example, FIG. 17 illustrates the converter of FIG. 8, with the switches 60, 62, and 64 each constituted by a MOSFET shown with its reverse parallel diode, with the isolating transformer 26 replaced by an autotransformer 80 which provides a step-down from the primary winding, formed by the single winding of the autotransformer, to the secondary winding, constituted by a tapped portion of this single winding. FIG. 18 illustrates a similar converter which provides a step-up from the primary winding, formed by a tapped portion of a single winding of an autotransformer 82, to the secondary constituted by all of this single winding.

Figure 19:
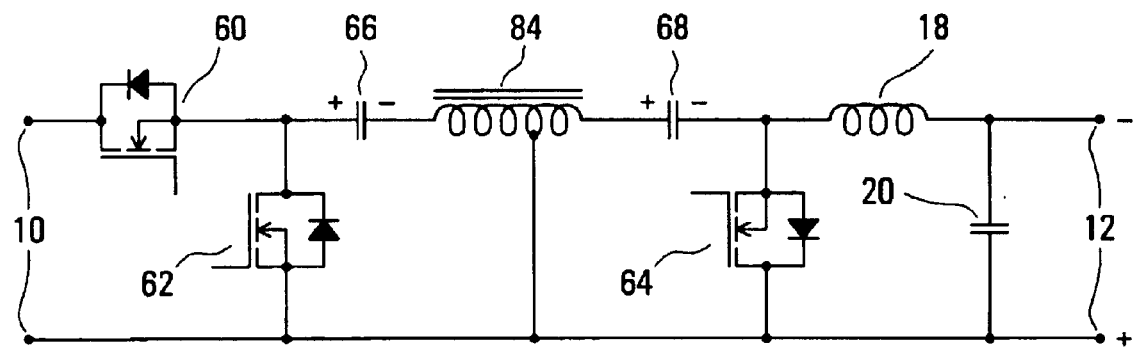
FIG. 19 schematically illustrates a DC converter, in accordance with a further embodiment of this invention, having another transformer arrangement.

FIG. 19 illustrates another similar DC converter, using an autotransformer 84 with a single winding a tapping point of which is connected to the common path between the input and output terminals, the primary and secondary windings thus being formed by different tapped portions of this winding. With this transformer arrangement the polarity of the secondary winding is reversed, and consequently the polarities of the capacitor 68, switch 64, and output terminals 12 are also reversed as shown relative to the polarity of the input circuit.

The converters of FIGS. 17 and 18 are also bidirectional, so in the same manner as described above they can be used in the reverse direction as boost regulators with the terminals 12 serving as input terminals and the terminals 10 serving as output terminals. The same applies to the converter of FIG. 19, except that in this case the capacitor 24 is not shown in FIG. 19 and is also required. Also as described above, in the converter of each of FIGS. 17 to 19 the input capacitor 24 or 20 is optional and may be omitted.

The use of an autotransformer, instead of a transformer 26 with isolated primary and secondary windings, can provide particular advantages in the event that a relatively high step-down or step-up voltage transfer ratio is desired between input and output terminals which do not need to be isolated from one another, while still maintaining a manageable duty cycle (a duty cycle of about 50% is desirable for various reasons) for the converter switches. For example, a converter as shown in FIG. 17 may be desirable for providing a high step-down voltage transfer ratio from a 12 volt input at the terminals 10 to an output of the order of 1 or 2 volts at the output terminals 12. A converter as shown in FIG. 18 may be desirable for providing a high step-up voltage transfer ratio from a 12 volt input at the terminals 10 to an output of the order of 100 volts or more at the output terminals 12.

Used in the reverse direction in a boost regulation mode which is preferred for power factor correction, the converter of FIG. 18 may desirably be used for power factor correction of a rectified 220 volt AC input at the terminals 12 to produce a lower output voltage, for example 48 volts, at the terminals 10, such lower voltage being potentially desirable as an input voltage for a subsequent DC converter stage.

Although particular embodiments of the invention and examples of variations and applications have been described above in detail, it can be appreciated that these and numerous other modifications, variations, and adaptations may be made without departing from the scope of the invention as defined in the claims.

What is claimed is:

1. A DC converter comprising a buck or boost regulator coupled between input terminals for a supply voltage and output terminals for a regulated output of the converter, the regulator including at least a first switch which is controllable for regulating said output, and a transformer, wherein the regulator comprises an input circuit coupled to the input terminals and having a first capacitor connected in series with a primary winding of the transformer, and an output circuit coupled to the output terminals and having a second capacitor connected in series with a secondary winding of the transformer, the converter being arranged for operation in successive cycles each comprising a phase of energy transfer via the transformer from the first capacitor to the second capacitor during a first state of said switch, and a phase of charge balancing between the capacitors during a second state of said switch.

2. A converter as claimed in claim 1 wherein said first switch is connected in series with the first capacitor and primary winding between the input terminals, and the input circuit further comprises a second switch in parallel with the series-connected first capacitor and primary winding, the second switch being controlled in a complementary manner to the first switch.

3. A converter as claimed in claim 1 wherein the input circuit comprises four switches connected to the input terminals in a full bridge arrangement, the series-connected first capacitor and primary winding being connected in a diagonal of the bridge.

4. A converter as claimed in claim 1 wherein the input circuit comprises two switches connected in series, and two capacitors connected in series, between the input terminals, the primary winding being connected between a junction between the two switches and a junction between said two capacitors, said two capacitors constituting said first capacitor connected in series with the primary winding.

5. A converter as claimed in claim 1 wherein the output circuit comprises an inductor connected in series with the second capacitor and secondary winding between the output terminals, a diode or switch in parallel with the series-connected second capacitor and secondary winding, and a capacitor coupled between the output terminals.

6. A converter as claimed in claim 2 wherein the output circuit comprises an inductor connected in series with the second capacitor and secondary winding between the output terminals, a diode or switch in parallel with the series-connected second capacitor and secondary winding, and a capacitor coupled between the output terminals.

7. A converter as claimed in claim 3 wherein the output circuit comprises an inductor connected in series with the second capacitor and secondary winding between the output terminals, a diode or switch in parallel with the series-connected second capacitor and secondary winding, and a capacitor coupled between the output terminals.

8. A converter as claimed in claim 4 wherein the output circuit comprises an inductor connected in series with the second capacitor and secondary winding between the output terminals, a diode or switch in parallel with the series-connected second capacitor and secondary winding, and a capacitor coupled between the output terminals.

9. A converter as claimed in claim 1 wherein the transformer primary and secondary windings are electrically isolated from one another.

10. A converter as claimed in claim 1 wherein the transformer comprises an autotransformer.

11. A DC converter comprising:
a transformer having first and second windings;
first, second, and third controllable switches;
first, second, and third capacitors;
an inductor; and
a control circuit for controlling the swithches in cycles in which the first switch is only closed when the second and third switches are open, and each of the second and third switches is only closed when the first switch is open;
wherein the first winding, first capacitor, and first switch are coupled in series between a first pair of terminals;

the second switch is coupled parallel with the series-connected first winding and first capacitor;

the second winding, second capacitor, and inductor are coupled in series between a second pair of terminals;

the third switch is coupled in parallel with the series-connected second winding and second capacitor; and the third capacitor is coupled between one of the first and second pairs of terminals.

12. A converter as claimed in claim 11 and including a fourth capacitor coupled between the other of the first and second pairs of terminals.

13. A converter as claimed in claim 12 wherein the first capacitor is constituted by two capacitors each connected between the first winding and a respective terminal of the first pair of terminals.

14. A converter as claimed in claim 11 and including two further controllable switches via which the first winding is connected to respective terminals of the first pair of terminals.

15. A DC converter as claimed in claim 11 wherein each controllable switch comprises a semiconductor switch having a reverse parallel diode.

16. A converter as claimed in claim 11 wherein the transformer windings are electrically isolated from one another.

17. A converter as claimed in claim 11 wherein the transformer comprises an autotransformer.

18. A DC converter comprising a transformer having a first winding coupled in series with a first capacitor and a first controllable switch between a first pair of terminals, and a second winding coupled in series with a second capacitor and an inductor between a second pair of terminals; a second controllable switch coupled in parallel with the series-connected first winding and first capacitor; a control circuit for controlling the first and second switches to be opened and closed in a substantially complementary manner; a diode coupled in parallel with the series-connected second winding and second capacitor and poled for conduction during times when the second switch is closed; and a third capacitor coupled between one of the first and second pairs of terminals.

19. A converter as claimed in claim 18 and including a fourth capacitor coupled between the other of the first and second pairs of terminals.

20. A converter as claimed in claim 19 wherein the first capacitor is constituted by two capacitors each connected between the first winding and a respective terminal of the first pair of terminals.

21. A converter as claimed in claim 18 and including two further controllable switches via which the first winding is connected to respective terminals of the first pair of terminals.

22. A converter as claimed in claim 18 wherein each controllable switch comprises a semiconductor switch having a reverse parallel diode.

23. A converter as claimed in claim 22 wherein said diode coupled in parallel with the series-connected second winding and second capacitor is constituted by a reverse parallel diode of a further controllable semiconductor switch.

24. A converter as claimed in claim 18 wherein said diode coupled in parallel with the series-connected second winding and second capacitor is constituted by a reverse parallel diode of a further controllable semiconductor switch.

25. A converter comprising:

a first switch, a first capacitor, and a first winding of a transformer coupled in series between a first pair of terminals;

a second switch coupled in parallel with the series-connected first capacitor and first winding;

a second winding of the transformer, a second capacitor, and an inductor coupled in series between a second pair of terminals;

a third switch coupled in parallel with the series-connected second winding and second capacitor;

a third capacitor coupled between the first or the second pair of terminals; and a circuit for controlling the switches, the first and second switches being controlled to be opened and closed in a substantially complementary manner, and the third switch being controlled to be closed and open substantially when the second switch is closed and opened, respectively.

26. A converter as claimed in claim 25 wherein at least one of the switches comprises a bidirectional switch.

27. A converter as claimed in claim 25 wherein the transformer windings are electrically isolated from one another.

28. A converter as claimed in claim 25 wherein the transformer comprises an autotransformer.

* * * * *